(12) United States Patent
Larsson et al.

(10) Patent No.: US 7,577,160 B2
(45) Date of Patent: Aug. 18, 2009

(54) MB-OFDM TRANSMITTER AND RECEIVER AND SIGNAL PROCESSING METHOD THEREOF

(75) Inventors: Torbjorn A. Larsson, San Diego, CA (US); Nishant Kumar, San Diego, CA (US)

(73) Assignees: Staccato Communications, Inc., San Diego, CA (US); Samsung Electronics, Inc., Kyungki-Do (KR)

( * ) Notice: Subject to any disclaimer, the term of this patent is extended or adjusted under 35 U.S.C. 154(b) by 74 days.

(21) Appl. No.: 11/663,607

(22) PCT Filed: Feb. 28, 2005

(86) PCT No.: PCT/KR2005/000553

§ 371 (c)(1),
(2), (4) Date: Oct. 9, 2007

(87) PCT Pub. No.: WO2006/033509

PCT Pub. Date: Mar. 30, 2006

(65) Prior Publication Data

US 2008/0062858 A1    Mar. 13, 2008

(30) Foreign Application Priority Data

Sep. 22, 2004  (US) .............................. 10/948,615
Feb. 21, 2005  (KR) ...................... 10-2005-0014252

(51) Int. Cl.
H04Q 11/02 (2006.01)
(52) U.S. Cl. .................. 370/430; 370/204; 370/375; 370/389; 370/395; 375/206; 375/222; 375/347; 375/350

(58) Field of Classification Search ................ 370/204, 370/206, 208, 210, 375, 376, 389, 395; 375/130, 375/141, 206, 222, 316, 347, 350
See application file for complete search history.

(56) References Cited

U.S. PATENT DOCUMENTS 5,790,514 A * 8/1998 Marchok et al. ............ 370/208

(Continued)

FOREIGN PATENT DOCUMENTS

KR    2003/0062273    7/2003

(Continued)

OTHER PUBLICATIONS

IEEE P802.15, TI Physical Layer Proposal for IEEE 802.15 Task Group 3a, May 2003.

(Continued)

Primary Examiner—Andrew C Lee
(74) Attorney, Agent, or Firm—Van Pelt, Yi & James LLP

(57) ABSTRACT

A method of improving frequency diversity of a signal that includes a plurality of orthogonal frequency division multiplexing (OFDM) symbols comprises receiving an input data sequence, mapping the input data sequence to a transmission data sequence, wherein the mapping includes performing a mapping operation and generating an OFDM symbol using the transmission data sequence. An orthogonal frequency division multiplexing (OFDM) transmitter comprises an interface configured to receive an input data sequence, and a processor configured to perform a mapping operation, to map the input data sequence to a transmission data sequence wherein the mapping includes performing the mapping operation, and to generate an OFDM symbol using the transmission data sequence.

3 Claims, 5 Drawing Sheets

U.S. PATENT DOCUMENTS

| | | | |
|---|---|---|---|
| 6,304,596 B1 * | 10/2001 | Yamano et al. | 375/222 |
| 6,473,394 B1 * | 10/2002 | Marchok et al. | 370/208 |
| 6,490,269 B1 * | 12/2002 | Yamaura | 370/343 |
| 6,622,281 B1 | 9/2003 | Yun et al. | |
| 6,798,826 B1 | 9/2004 | Shiu et al. | |
| 6,882,217 B1 * | 4/2005 | Mueller | 330/2 |
| 6,912,194 B1 * | 6/2005 | Marchok et al. | 370/208 |
| 6,925,128 B2 | 8/2005 | Corral | |
| 6,968,017 B2 * | 11/2005 | Nielsen | 375/316 |
| 7,010,053 B2 * | 3/2006 | El-Gamal et al. | 375/267 |
| 7,113,559 B2 * | 9/2006 | Baas et al. | 375/350 |
| 7,170,849 B1 * | 1/2007 | Arivoli et al. | 370/208 |
| 7,263,133 B1 * | 8/2007 | Miao | 375/267 |
| 7,277,498 B2 | 10/2007 | Hanaoka et al. | |
| 7,289,494 B2 | 10/2007 | Lakkis | |
| 7,313,190 B2 | 12/2007 | Balakrishnan et al. | |
| 7,342,875 B2 * | 3/2008 | Hammons et al. | 370/219 |
| 7,362,817 B2 | 4/2008 | Ojard | |
| 2002/0089923 A1 | 7/2002 | Yoshida et al. | |
| 2003/0073464 A1 | 4/2003 | Giannakis et al. | |
| 2004/0001429 A1 | 1/2004 | Ma et al. | |
| 2004/0032354 A1 | 2/2004 | Knobel et al. | |
| 2004/0062193 A1 | 4/2004 | Ma et al. | |
| 2004/0190640 A1 | 9/2004 | Dubuc et al. | |
| 2005/0018750 A1 | 1/2005 | Foerster et al. | |
| 2005/0047444 A1 | 3/2005 | Park et al. | |

FOREIGN PATENT DOCUMENTS

| | | |
|---|---|---|
| WO | WO 02/062002 | 8/2002 |

OTHER PUBLICATIONS

IEEE 802.15-03/267r2, Multi-band OFDM Physical Layer Proposal, Jul. 2003.

IEEE, Multi-band OFDM Physical Layer Proposal for IEEE 802.15 Task Group 3a, Apr. 2005.

* cited by examiner

[Fig. 1]
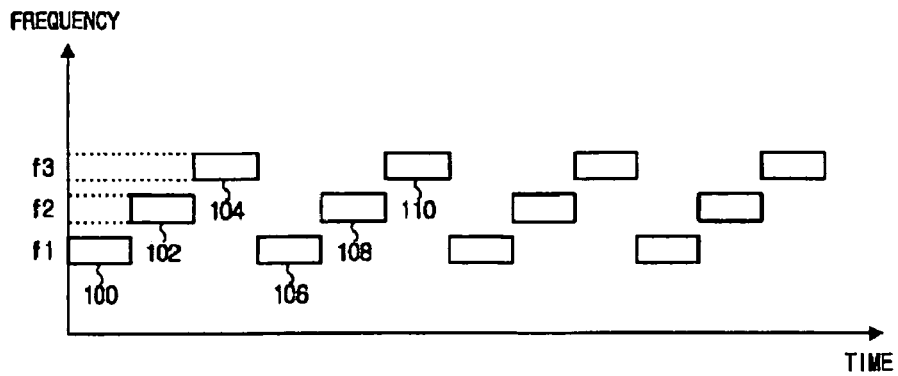
[Fig. 2]
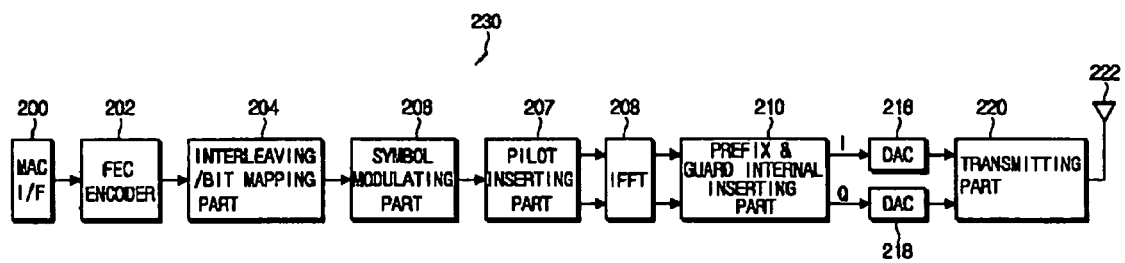
[Fig. 3]
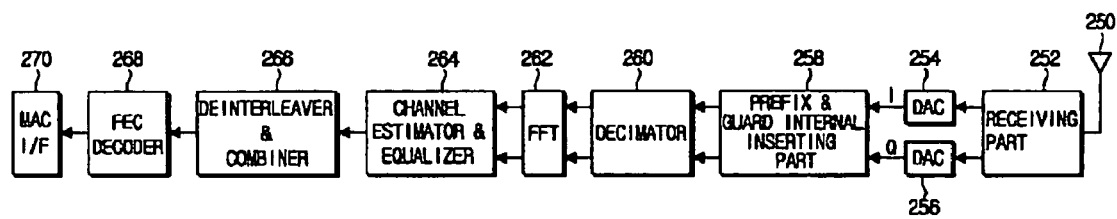
[Fig. 4]
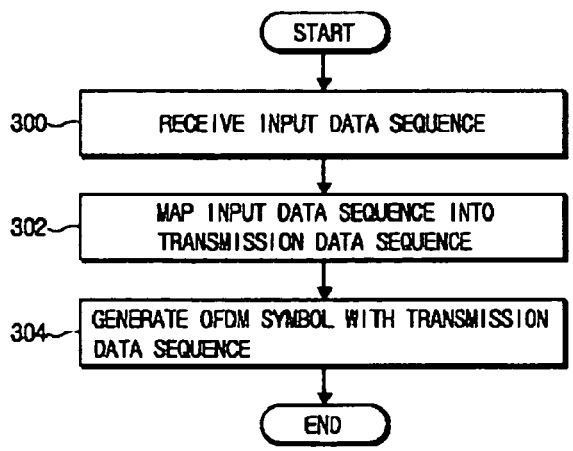

[Fig. 7]
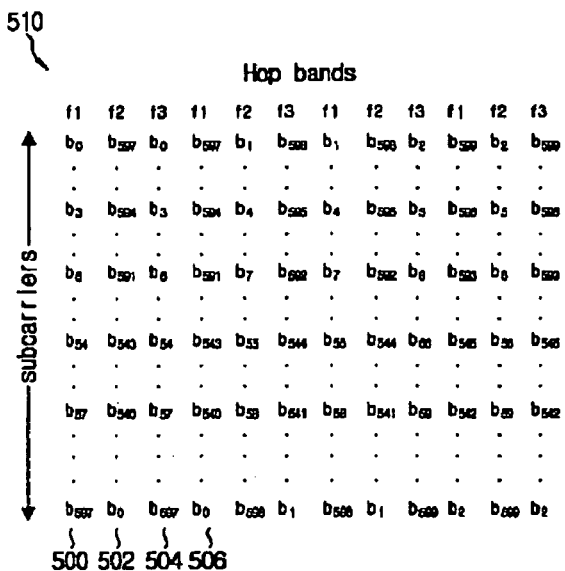
[Fig. 8]
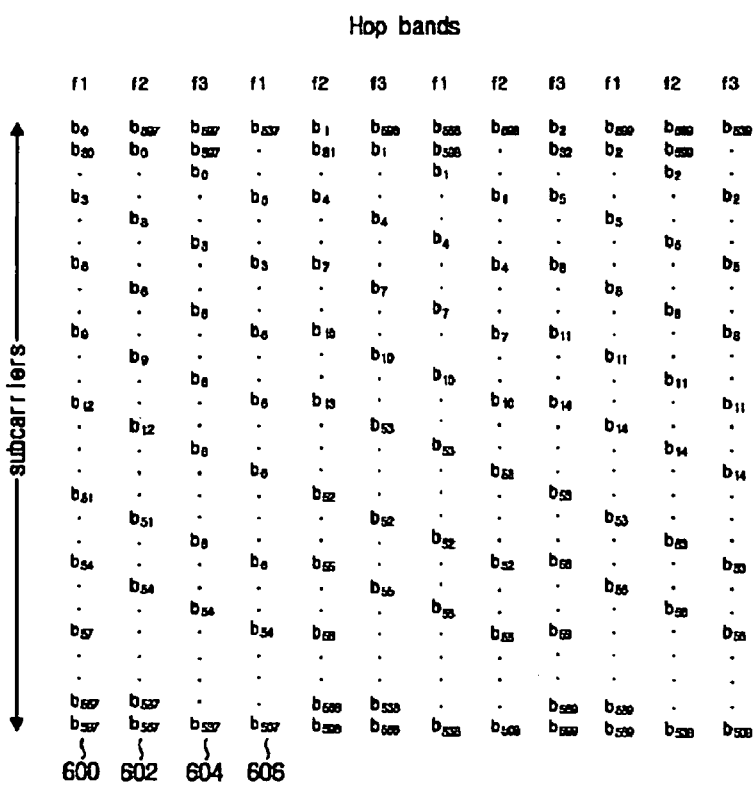

[Fig. 9]
Hop bands
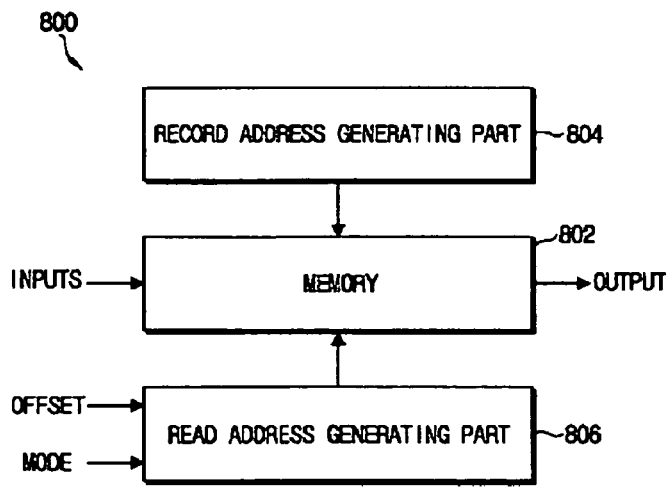
[Fig. 10]
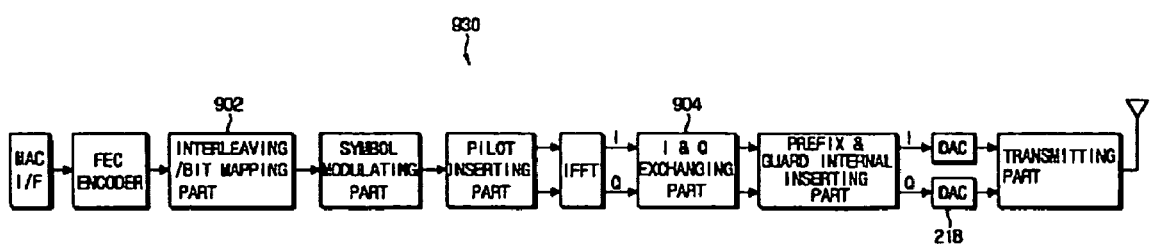
[Fig. 11]

MB-OFDM TRANSMITTER AND RECEIVER AND SIGNAL PROCESSING METHOD THEREOF

TECHNICAL FIELD

The present invention relates to a communication system, and more particularly, to an OFDM (orthogonal frequency divisional multiplexing) transmitting apparatus and a method thereof.

BACKGROUND ART

MB-OFDM (Multiband-Orthogona Frequency Division Multiplexing) is particularly used in a wireless communication system such as UWB (Ultra-WideBand) system. MB-OFDM is usually used in combination with a frequency hopping technology.

MB-OFDM is suitable for a device which is designed to satisfy the Federal Communications Commission (FCC) regulations on UWB devices. According to the current regulations, a UWB device is allowed to operate in the frequency bandwidth from 3.1 to 10.6 GHz, with the emission of power always kept under −41.3 dBm/MHz within the signal bandwidth.

In a particular MB-OFDM system, coded bits are transmitted in the form of an OFDM symbol, each containing QPSK (Quadrature Phase Shift Keying) or DCM (Dual Carrier Modulation, or tone), and a pilot tone.

As a result, the resultant waveform is a frequency hopping waveform in which each OFDM symbol corresponds to the hops in the transmission frequency bandwidth. A local oscillator generally maintains the same frequency setting during the entire transmission period.

FIG. 1 shows a frequency hopping pattern of a MB-OFDM system. Referring to FIG. 1, each rectangle represents an OFDM symbol which carries 200 bits (or 100 bits). Three hop bandwidths (f1, f2, f3) facilitate frequency hopping among the symbols.

Each of the symbols 100, 102, 104 is modulated using carriers which are respectively different from each other according to the frequency bandwidths (f1, f2, f3). Accordingly, patterns repeats with respect to the next three symbols (106, 108, 110).

The frequency hopping technology is advantageous in reducing interference between neighboring UWB devices. However, this technology accompanies the following several problems. When the dat is transmitted with lower rate than supported in the system, generally, the data bits are copied and modulated for transmission.

Accordingly, the same data bits can be modulated several times in the same subcarrier frequency, and as a result, the copied symbols fall into the same multipath and fading conditions. Accordingly, frequency diversity decreases.

Additionally, because the neighboring data bits usually have the same frequency, or are usually coded using the adjacent subcarrier, this also deteriorates frequency diversity. Accordingly, a data bit coding method, which can improve frequency diversity of not only the same data, but also the adjacent data bits, is demanded. Also, a coding method, which does not accompany a considerable amount of additional costs and increase of complication with existing transmitter and receiver, is required.

DISCLOSURE OF INVENTION

Technical Problem

Accordingly, an object of the present invention is to provide a method and a system which is capable of improving frequency diversity of a signal containing a plurality of OFDM symbols.

Technical Solution

The above object of the present invention can be substantially achieved by providing an OFDM (Orthogonal Frequency Division Multiplexing) signal processing method for improving a frequency diversity of a signal which contains a plurality of OFDM symbols therein, the OFDM signal processing method comprising the steps of: receiving an input data sequence, mapping the input data sequence by a predetermined mapping method into a transmission data sequence, and generating an OFDM symbol by using the transmission data sequence.

The input data sequence preferably has a bit order, and the mapping changes the bit order of the transmission data sequence.

The mapping preferably comprises at least one of repetition, shift, reversal, shift-plus-reversal, and reversal-plus-shift.

More preferably, the shift comprises a circulative shift.

Preferably, the step of applying IFFT (Inverse Fast Fourier Transform) with respect to the transmission data sequence, is additionally provided.

Here, it is preferable that the input data sequence is interleaved.

Additionally, the step of secondly mapping the transmission data sequence into a second transmission data sequence, is preferably provided.

It is more preferable to additionally provide the step of generating a second OFDM symbol by repeating the transmission data sequence.

Additionally, it is preferable that the step of mapping the transmission data sequence into a second transmission data sequence by performing a second mapping which comprises repetition, shift, reversal, shift-plus-reversal, and reversal-plus-shift, is further provided.

Preferably, the step of mapping the input data sequence into a second transmission data sequence by performing a predetermined second mapping operation and therefore transmitting the data as the OFDM symbols, is additionally provided.

Further, the step of generating a second transmission data sequence by mapping the transmission data sequence and generating a second OFDM symbol by using the second transmission data sequence, is preferably added.

The above object of the present invention can also be substantially achieved by providing an OFDM (Orthogonal Frequency Division Multiplexing) transmitting apparatus, which comprises an interface which receives an input data sequence, and a processor connected with the interface, and maps the input data sequence into a transmission data sequence, and generates an OFDM symbol by using the transmission data sequence.

The processor preferably applies IFFT (Inverse Fast Fourier Transform) with respect to the transmission data sequence.

Preferably, the processor secondly maps the transmitting data sequence into a second transmission data sequence.

Further, the processor preferably generates a second OFDM symbol by repeating the transmission data sequence.

Further, an OFDM (Orthogonal frequency division multiplexing) signal processing method for improving a frequency diversity of a signal which contains a plurality of OFDM symbols therein, according to the present invention includes the steps of: receiving an input data sequence, interleaving the input data sequence; shifting the input data sequence and generating the shifted input data sequence; generating an OFDM symbol by applying an IFFT (Inverse Fast Fourier Transform) with respect to the shifted input data sequence; exchanging an I and a Q components of a part of the OFDM symbol; and transmitting the exchanged OFDM symbol.

According to the present invention, an OFDM (Orthogonal Frequency Division Multiplexing) transmitting apparatus includes an interface which receives an input data sequence, and a processor connected with the interface, interleaves the input data sequence, shifts the input data sequence and generates the shifted input data sequence, generates an OFDM symbol by applying an IFFT (Inverse Fast Fourier Transform) with respect to the shifted input data sequence, exchanges an I and a Q components of a part of the OFDM symbol, generates an RF signal by modulating the exchanged OFDM symbol, and transmits the RF signal.

Additionally, according to the present invention, a signal demodulating method of an OFDM (Orthogonal Frequency Division Multiplexing) receiving apparatus, includes the steps of: receiving an input signal, converting the input signal into a baseband signal, generating a plurality of repetitive soft symbols by applying FFT (Fast Fourier Transform) with respect to the baseband signal, and generating one soft symbol by combining the plurality of soft symbols.

Further, according to the present invention, an OFDM (Orthogonal Frequency Division Multiplexing) receiving apparatus includes an interface which receives an input signal, and a processor which converts the input signal into a baseband signal, generates a plurality of repetitive soft symbols by applying FFT (Fast Fourier Transform) with respect to the baseband signal, and generates one soft symbol by combining the plurality of soft symbols.

Advantageous Effects

According to the present invention, by performing bit processing operations such as repetition, shift, reverse, shift-plus-reverse, and reverse-plus-shift with respect to incoming data bits, frequency diversity with respect to not only the same data, but also the adjacent dat bits, can be improved.

Additionally, because complex in achieving a hardware with respect to the existing digital transmitter and receiver does not increase, there is no increase of costs.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

BRIEF DESCRIPTION OF THE DRAWINGS

The above aspects and features of the present invention will be more apparent by describing certain exemplary embodiments of the present invention with reference to the accompanying drawings, in which:

FIG. 1 is a view provided for explanation of a frequency hopping pattern according to a general MB-OFDM system.

FIG. 2 is a block diagram representing a UWB transmitter according to one embodiment of the present invention.

FIG. 3 is a block diagram representing a UWB receiver according to another embodiment of the present invention, FIG. 4 is a flowchart provided for explanation of a process for improving a frequency diversity of a signal which contains an OFDM symbol according to one embodiment of the present invention, FIG. 8 is a view representing a pattern of transmission data according to another embodiment of the present invention, FIG. 9 is a view representing a pattern of transmission data according to yet another embodiment of the present invention, FIG. 10 is a block diagram representing a circuit for achieving interleaving and repeat functions according to an embodiment of the present invention, and FIG. 11 is a block diagram representing a transmitter according to yet another embodiment of the present invention.

BEST MODE FOR CARRYING OUT THE INVENTION

Figure 5:
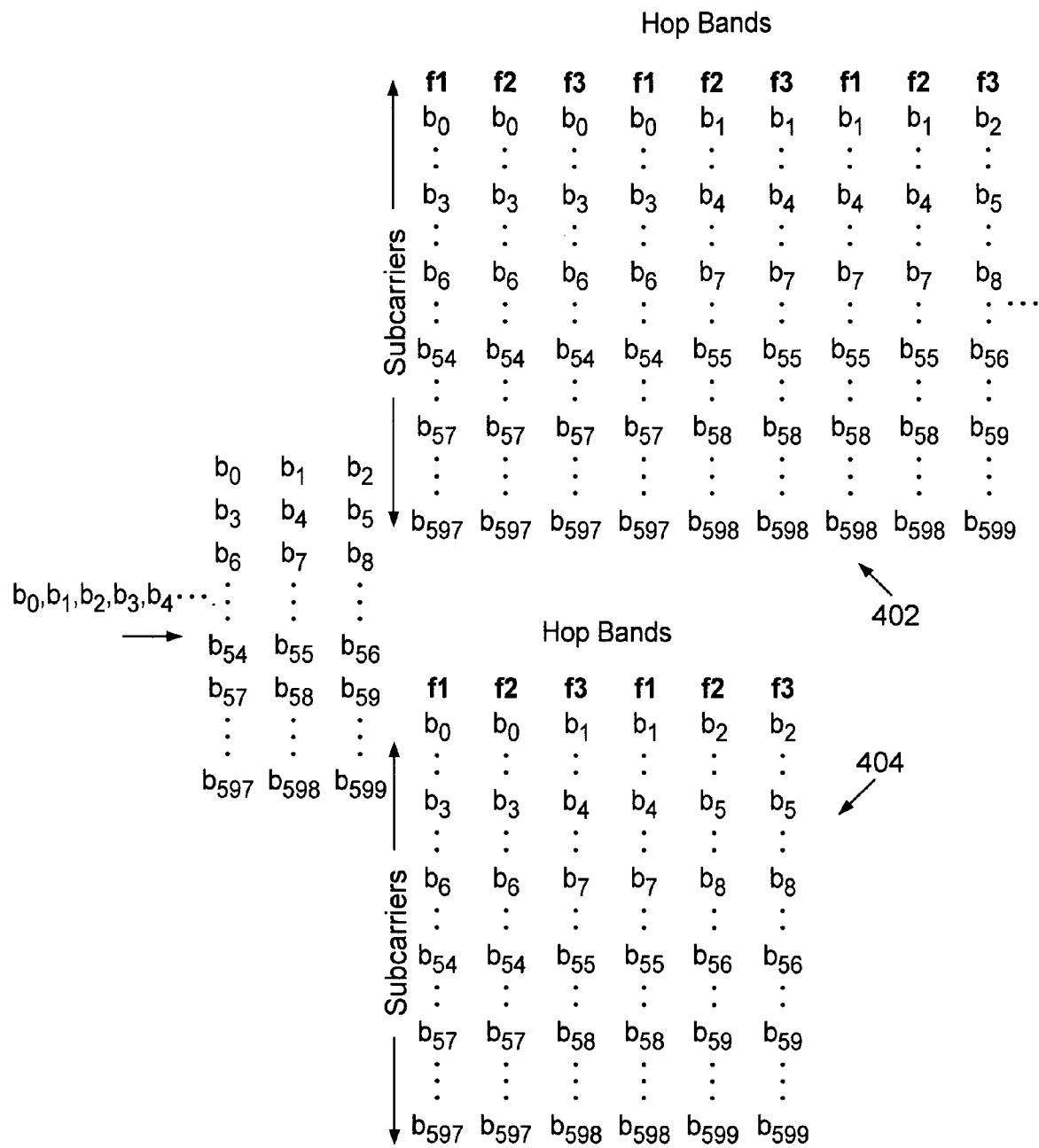
FIG. 5 is a view representing the result of interleaving and repeat functions according to one embodiment of the present invention.

Hereinafter, the present invention will be described in detail with reference to illustrative accompanying drawings.

The present invention is applicable in a variety of ways, such as process, apparatus, combination of components, computer recording medium, or a computer network transmitting program commands via optical, or electronic communication links. The following description sets forth only an exemplary embodiment of the present invention, and one will appreciate that modifications can be made to the methods as described, or all the other possible types of the present invention, and the order of processes as described, without departing from the scope of the present invention.

Hereinbelow, an OFDM transmitting/receiving apparatus, and a signal processing method thereof, which is capable of improving frequency diversity of a signal containing a plurality of OFDM symbols, will be described. A sequence of data, which is input from the OFDM transmitter, is mapped into a transmission data sequence for the transmission with OFDM symbols. In the following embodiments of the present invention, the mapping operation includes a variety of proper operations, or a combination of the operations such as repetition, shift, reverse, shift-plus reverse, reverse-plus-shift.

Additionally, in certain embodiments, the transmission data sequence can be mapped into another transmission data sequence for the transmission with other OFDM symbols. In the same MB-OFDM system, in order to ensure different data rates according to different mapping operations, or in order to ensure the same data rate under different MB-OFDM systems, different mapping operations can be used. By generating a repeated input data sequence, bits for the OFDM symbols in different subcarrier frequency can be extended, and more improved frequency diversity can be obtained.

FIG. 2 is a block diagram illustrating a UWB transmitter according to one embodiment of the present invention.

In a UWB transmitter according to the embodiment of the present invention, an OFDM technology is used. A FEC (Forward Error Correction) encoding part 202 encodes the data bits which are received through a MAC (Medium Access Control) interface 200. Because the adjacent subcarriers often fall into the multipath and fading conditions, the interleaver prevents subsequent code bits from transmitting from the adjacent subcarriers with the same OFDM symbol. In this embodiment, the encoded bits can be interleaved by the plurality of OFDM symbols.

An interleaving/bit mapping part 204 performs one or more than one mapping operations with respect to the data bit. The bits can be mapped in the order of reverse, or shift or the combination of the two, and this will be described below. After the mapping, the data sequence is transmitted in the final form, that is, as an OFDM symbol. In this embodiment, the interleaving/bit mapping part 204 may perform a plurality of mapping operations with respect to the inputted bit sequence in order to generate a plurality of mapping results. Additionally, the interleaving/bit mapping part 204 performs the second mapping operation in order to generate another output which will be transmitted with the other OFDM symbol. In this embodiment where a plurality of mapping operations are performed, the mapping according to the above operations can be performed in the same, or different manner, depending on the system. The bandwidth of the transmitted signal according to the mapping is extended beyond the information bandwidth, and accordingly, additional frequency diversity is generated, and the transmitted signal can be more robust against multipath and interferences.

Next, a symbol modulating part 206 modulates the bits, which are interleaved and repeated, into a symbol. In the depicted embodiment, a pair of successive bits are mapped into QPSK symbol by using the QPSK modulation. In addition to the QPSK modulation, any other suitable modulations can be employed. A pilot inserting part 207 inserts a pilot tone in the modulated symbol. An IFFT (Inverse Fast Fourier Transform) part 208 block-wise converts the symbol into a waveform in the time domain (or, OFDM symbol). In certain embodiments, a prefix/GI (guard interval) inserting part 210 adds a guard interval and circulation/zero prefix in each of the repeated OFDM symbols, in front of the preamble. Additionally, in certain embodiments, interference and amplitude clipping may be selectively applied to the OFDM symbol. A D/A converter 216, 218 converts the I (Inphase) and Q (Quadrature) components of a baseband OFDM signal from digital into analogue form. Accordingly, an analogue signal is outputted and sent to the transmitting part 220 to be sent out via an antenna 222.

FIG. 3 is a block diagram representing a UWB receiver according to one embodiment of the present invention. According to this embodiment, an OFDM signal, which is received through the antenna 250 of the receiving part 252, is divided into I and Q components, and converted into baseband. An A/D converter 254, 256 converts the baseband signal into digital. In this embodiment, a decimator 258 selectively processes the digital signal in the baseband. A prefix/GI removing part 260 removes the prefix and the GI. A FFT (Fast Fourier Transform) part 262 converts a OFDM waveform in the time domain into a sample in the frequency domain. A channel estimation/equalization part 264 processes the sample in the frequency domain, and minimizes the influence of the multipath propagation. After the equalization, the received subcarrier and the sample show the similar pattern with that of the QPSK symbol noise, or with the QPSK symbol noise which is derived from the real and imaginary numbers of the QPSK symbol. In either case, the symbol is called a 'soft symbol'.

A deinterleaver/combiner 266 receives a soft symbol, and un-does the operations by the interleaver/bit mapping part 204 of FIG. 2a. The same soft symbols, which are received a plurality of times, are combined into one. This combining process can be achieved in various modes. In certain embodiments, a MR (Maximal-Ratio) combining method is used, and accordingly, the received soft symbols are cumulatively summed according to the estimated amplitude of each of the corresponding subcarriers that has the received soft symbol. Subsequently, the summed soft symbols are outputted as one symbol. Next, deinterleaving is performed with respect to the final output of the soft symbol, and therefore, the operation by the interleaver is undone. A FEC decoder 268 decodes the deinterleaved symbol sequence. The decoded signal is transmitted to the MAC interface 270 for the processing of remaining signals.

FIG. 4 is a flowchart explaining the process of improving frequency diversity of a signal which contains OFDM symbols according to one embodiment of the present invention. First, an input data sequence is received (S300). Next, the input data sequence is mapped into transmission data sequence (S302). The mapping process may include various proper operations such as shift, reverse, repetition, shift-plus-reverse, and reverse-plus-shift, or a combination of the operations. The mapping operations can be properly selected according to the embodiments. Next, an OFDM symbol is generated by using the transmission data sequence (S204). As the mapping operations are selectively repeated with respect to the same input data, another OFDM symbol is generated. In certain embodiments, different mapping operations can be employed to generate different transmission data sequences.

FIG. 5 is a view provided for explanation of the result of interleaving and bit mapping according to one embodiment of the present invention. According to this embodiment, the input bit sequence ($b_0$, $b_1$, $b_2$, $b_3$, . . . ) is transmitted to the interleaver. First, the data bits are interleaved into a first sequence of bits ($b_0$, $b_3$, $b_6$, . . . $b_{597}$), a second sequence of bits ($b_1$, $b_4$, $b_7$, . . . $b_{598}$), and a third sequence of bits ($b_2$, $b_5$, $b_8$, . . . $b_{599}$). In certain embodiments, the first, second and third sequences are respectively mapped into different subcarriers at wider intervals by the tone interleaver. The depth of the interleaving depends on the embodiment as employed. For example, if 10 tone interleaving depth is used, the first sequence after the tone interleaving will be $b_0$, $b_{30}$, $b_{60}$, . . . , $b_{597}$, the second sequence after the tone interleaving will be $b_1$, $b_{31}$, $b_{61}$, . . . , $b_{598}$, and the third sequence after the tone interleaving will be $b_2$, $b_{32}$, $b_{62}$, . . . , $b_{599}$, respectively. Next, the input sequences are respectively modulated into OFDM symbols by using the subcarriers at the hop bandwidth. In certain embodiments, the modulation can employ multiplication of numbers of respective sequences by the corresponding subcarrier signals. Next, the same bit sequence repeats according to the same order, and modulated into different OFDM symbols using the subcarriers of next hop bandwidth. With reference to the drawings, the transmission data pattern (402, 404) are used to generate OFDM symbol which is transmitted at different rates. The sequences of the transmission pattern are modulated, and OFDM symbols are generated using the subcarriers of the hop bandwidth at the first row of each column. For the convenience of explanation, the bandwidth hopping among the three frequency bandwidths (f1, f2, f3) follows the sequential order as exemplified in this embodiment. However, in certain embodiments, the number and/or the order of hops can be varied.

According to this particular embodiment, repetition is used as a mapping operation. Each of the input bit sequences has 600 data bits which are repeated four times in the pattern 402 of 12 OFDM symbols are transmitted, and ¼ transmission data rate, which is maximum, is obtained. Because two OFDM symbols from the same input bit are modulated using the same subcarrier frequency, deterioration of frequency diversity is somewhat avoided according to the repetition. For example, the bit sequence of $b_0$-$b_{597}$ is initially modulated by using the subcarriers of hop bandwidths(f1, f3), and re-modulated with respect to the hop bandwidth (f1). Because the same symbol is transmitted with respect to the same subcarrier, this beams that the data is subject to the similar multipath and fading conditions. Therefore, the frequency diversity deteriorates. In the bit pattern 404, the bit sequence is repeated twice, and is not repeated at the subcarrier frequency which has the same repetition bit sequence. Therefore, the problem of frequency diversity is somewhat different. However, because the adjacent bits such as the first bit($b_0$) and the second bit($b_1$) can be transmitted with the same subcarrier frequency, the bits are still subject to the similar fading conditions.

Figure 6:
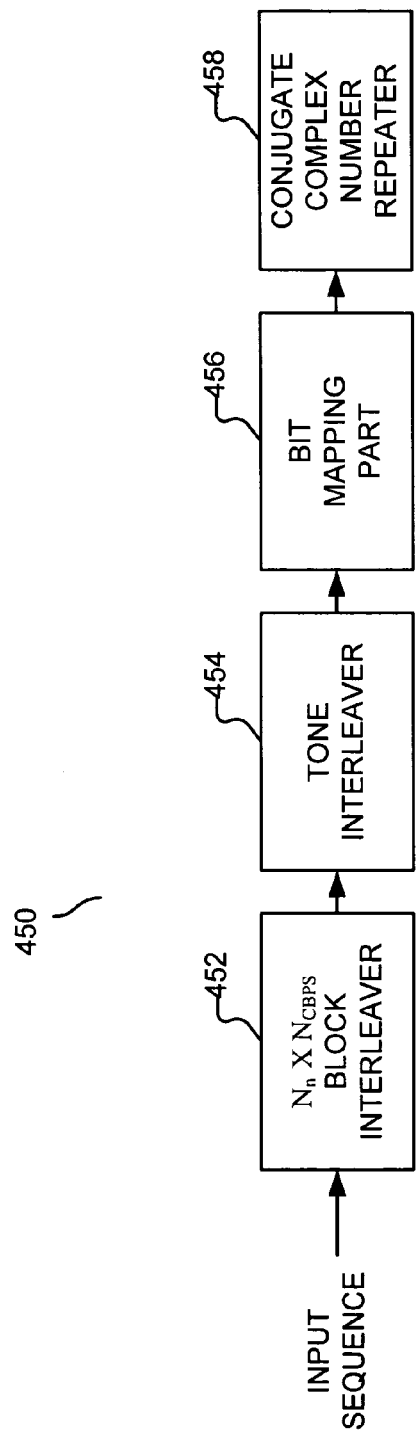
FIG. 6 is a block diagram representing an example of an interleaver and a bit mapping part for achieving interleaving and repeat functions of FIG. 4a, FIG. 7 is a view representing a pattern of transmission data according to one embodiment of the present invention.

FIG. 6 is a block diagram illustrating the interleaver/bit mapping part, which is used in the realization of the interleaving and repetition operations of FIG. 5. In this particular example, the input data sequence is firstly interleaved by using the $N_h \times N_{CBPS}$ block interleaver 452, where $N_h$ is the function of the number of hop bandwidths, and $N_{CBPS}$ is a number of code bits (set to 200 in the following example) per OFDM symbol before the repetition.

The interleaver 452 has the input bits recorded in the column-wise direction as the $N_h \times N_{CBPS}$ matrix, and read out according to the order of row-wise direction. The sub sequence of successive bits of $N_h$ is extended to the OFDM symbol (or hop bandwidth) of $N_h$. Accordingly, the output bits are interleaved by the second interleaver 454, which is so-called 'tone interleaver', and with respect to the bit block of $N_{CBPS}$ in size, the $N_{CBPS}$ bits of the respective OFDM symbols are divided into different tones (subcarriers).

The bit mapping part 456 performs one or more mapping operations with respect to the interleaved bits. The mapping operations vary according to the embodiments, and according to variables such as operation data rates of a system. In this particular example, repetitive function is used to map the input bits into the pattern same as the bit patterns 402, 404. The output from the bit mapping part 456 is selectively inputted to a conjugate complex number repeater 458 and repeated in each block of the $N_{CBPS}$ block. Accordingly, the block is extended to correspond to one OFDM symbol. In certain embodiments, certain bits are inverted during the repetition into a pair, and mapped into QPSK symbol block which is in symmetry with the conjugate complex number with reference to the middle line thereof. Accordingly, IFFT output has the real number value. Additionally, the conjugate complex number processing can be omitted in certain embodiments. In the above embodiment, the mapping operations are performed prior to the conjugate complex number processing. However, in certain embodiments, the mapping operations may be performed after the conjugate complex number processing, or before and after the conjugate complex number processing.

FIG. 7 is a view illustrating the pattern of transmitted data according to an embodiment of the present invention. In another embodiment, different extension rate is possible, however, the extension rate of 4 will be used in this particular embodiment for the convenience of explanation. In this embodiment, the column 500 represents the first input data sequence, which is interleaved bit sequence of ($b_0$-$b_{597}$), and it is modulated by using the subcarrier of the hop bandwidth (f1). In this embodiment, the mapping operation of reversal is used to generate the transmission data sequence. In other words, the input data bit sequence is reversed, and modulated by the subcarrier of the hop bandwidth (f2). The above operations repeat with respect to the reversed sequence, and therefore, the transmission data sequence 504 is generated for the transmission at the hop bandwidth (f3). As the above operations repeat, the transmission data sequences 506 for the transmission at the hop bandwidth (f1) are generated, and similarly, the respective transmission data sequences are also generated. In certain embodiments, instead of two times of inversion, transmission data sequence related with the first and second hop bandwidths(f1, f2) may be stored and repeated with respect to the third hop bandwidth (f3) and after, to generate the data sequence related with the third hop bandwidth (f3) and the next hop bandwidth (f1) and the next hop bandwidth (f2). Likewise, the input data bit sequence ($b_1$-$b_{598}$) is used to generate four successive transmission data sequences corresponding to the hop bandwidths (f2, f3, f1 and f2), and the input data bit sequence of ($b_2$-$b_{599}$) is used to generate four successive transmission data sequences corresponding to the hop bandwidths (f3, f1, f2 and f3). An interleaver/bit mapping block, which is similar to the interleaver/bit mapping part 450 of FIG. 4*b*, generates bit pattern 510. In this embodiment, the bit mapping part is constructed such that it reverses the order of the mapping bits.

In certain embodiments, the mapping includes the shifting operation. FIG. 9 shows the pattern of transmission data according to another embodiment of the present invention. According to another embodiment of the present invention, the data sequence 600 represents that the input bit sequence ($b_0$-$b_{597}$) is mapped with the subcarrier of the hop bandwidth (f1). The data sequence is then shifted in a circulation manner, and modulated by using the subcarrier of the hop bandwidth (f2) to generate a new sequence 602. As the above process repeats, data sequences 604, 606 are successively generated. Herein, bits are shifted in every mapping operation by the unit of one order. However, shift at proper length interval (L) may also be used. In certain embodiments, the value L is selected such that all the repeated bits and their adjacent bits are extended among the remote subcarriers to thereby reduce requirement for data correction for multipath and fading.

In another example, the mapping process may include shift-plus-reverse operation in which the input data sequence is firstly shifted and then reversed, and a reverse-plus-shift operation in which the input data sequence is reversed and then shifted. FIG. 7 shows the pattern of transmission data according to yet another embodiment of the present invention. In this embodiment, not only the shift-plus-reverse, but also the shift operation can be used. The first input data sequence of the column 700 is for generating a first OFDM symbol with respect to the hop bandwidth (f1). Subsequently, as the input data sequence is circulatively shifted and reversed by the unit of one bit, the transmission data sequence with respect to the hop bandwidth (f2), which is represented by the column 702, is generated. In another embodiment, different shift intervals can be properly used, and the direction of shift can also be selected differently. Next, the shift operation is performed with respect to a new sequence, and therefore, a transmission data sequence with respect to the hop bandwidth (f3) represented by the sequence 704, is generated. Then shift and reversal are performed with respect to the data sequence 704, and another data sequence 706 is generated. The similar conversion is performed with respect to the input data sequence ($b_1$-$b_{598}$) and the input data sequence ($b_2$-$b_{599}$) so that four OFDM symbols are respectively generated.

The circulative shift operation in the above explanation can be represented by the following equation:

$$b[i]=a_T[m(i)SN_{CBPS}+\text{mod}(i+m(i)SN_{cyc},N_{CBPS})],$$
$$\text{where } m(i)=*i/N_{CBPS}+, i=0,\ldots,N_{CBP6S}-1 \quad \text{[Equation 1]}$$

where, $a_T[i]$ is an input data sequence, and $b[i]$ is a transmission data sequence after the circulative shift operation with respect to the input data sequence.

FIG. 10 is a block diagram of a circuit which is used to achieve interleaving and repetition operations according to one embodiment of the present invention. According to this embodiment, both of the operations are performed at a circuit 800. In certain embodiments, certain operations may be achieved by separate components. The input data sequence is transmitted to a memory 802. A record address generating part 804 determines memory addresses for recording bits of respective input data sequences so that the stored bit sequences can be interleaved. In this embodiment, the record address generating part 804 performs two control operations. That is, an offset control in which offset position for storing the interleaved sequences is determined for data reading, and a mode control in which bits are read in forward or backward order in the data reading, are performed. The data are read out from the memory 802 a plurality of times and generate repetitive transmission data sequences. In certain embodiments, interleaving and mapping operations can be achieved by using separate components.

FIG. 11 is a block diagram of a transmitting apparatus according to yet another embodiment of the present invention. The reverse operation with respect to the bit order before the IFFT operation has the identical effect as the process of exchanging real number (I) and imaginary number (Q) of the complex number QPSK symbol from the output of the IFFT. Therefore, the reverse operation can be performed at the front end of the IFFT as shown in the transmitting apparatus 230 of FIG. 2. Amont the components of the transmitting apparatus 930, the similar elements to those of the transmitting apparatus 230 perform the similar functions. Accordingly, the interleaver/bit mapping part 902 performs both the interleaving and shifting. The exchanging part 904 performs reversal of bit order. The exchanging part 904 directly transmits the first OFDM symbol, and exchanges the I and Q components of the second OFDM symbol.

The exchange of I and Q components of the second OFDM symbol in the exchanging part 904 can be expressed by the following equations 2:

$$C_{D,2n}[l] = d_{frame}\left[\frac{N_D}{2}s(2n - N_{sync} - N_{hdr}) + l\right] \quad \text{[Equation 2]}$$

$$C_{D,2n+1}[l] =$$
$$Pspread[n]s\left\{imag\left(d_{frame}\left[\frac{N_D}{2}s(2n - N_{sync} - N_{hdr}) + (N_D - 1 - l)\right]\right) + jreal\left(d_{frame}\left[\frac{N_D}{2}s(2n - N_{sync} - N_{hdr}) + (N_D - 1 - l)\right]\right)\right\}$$

where, $C_{D,2n}[1]$ denotes an example of the first OFDM symbol, $C_{D,2n+1}[1]$ is an example of the second OFDM symbol, $d_{frame}[k]$ is an OFDM symbol inputted to the exchanging part 904 with k=0, 1, 2, ..., and $N_D$ is a constant, for example, a constant 100, which groups the OFDM symbols by the unit of certain numbers.

Further, $N_D$ denotes a number of data subcarriers, $N_{sync}$ is a number of symbols of a PLCP preamble, $N_{hdr}$ is a number of symbols of a PLCP header, imag(.) is an I component of an input OFDM symbol, and real(.) is a Q component of an input OFDM symbol.

Further, $$Pspread[n] = p\left[\text{mod}\left(n - \frac{N_{sync}}{2} + 6, N_{FFT} - 1\right)\right]$$

where p[.] is a pseudo random sequence which is 127 in length.

Accordingly, the receiving end combines the OFDM symbols using proper combining techniques such as MR combining, to generate soft symbol, which is usually called 'soft bit'. Then the order of every second bit blocks of the soft bits is reversed. The soft symbols are deinterleaved by the deinterleaver with respect to the NCBPS soft bit block, to reverse effect by the tone interleaver of the transmitting apparatus, and then reverses the effect of the first interleaver of the transmitting apparatus by the use of $N_h \times N_{CBPS}$.

The invention claimed is:

1. An OFDM (Orthogonal Frequency Division Multiplexing) transmitting apparatus, comprising:
    an interface which receives an input data sequence; and
    a processor connected with the interface, and maps the input data sequence into a transmission data sequence, and generates an OFDM symbol by using the transmission data sequence, wherein:
        the mapping comprises at least one of repetition, shift, reversal, shift-plus-reversal, and reversal-plus-shift;
        the shift comprises a circulative shift; and
        the circulative shift is performed with respect to the input data sequence $a_T[i]$ according to the equation:

$$b[i]=a_T[m(i)SN_{CBPS}+\text{mod}(i+m(i)SN_{cyc},N_{CBPS})],$$
$$\text{where } m(i)=*i/N_{CBPS}+, i=0,\ldots,N_{CBP6S}-1,$$

$N_{CBPS}$ is a number of coded bits per OFDM symbol, $N_{cyc}$ is a number of circulative shifts, and $N_{CBP6S}$ is a number of coded bits per 6 OFDM symbols.

2. An OFDM (Orthogonal Frequency Division Multiplexing) transmitting apparatus, comprising:
    an interface which receives an input data sequence; and
    a processor connected with the interface, interleaves the input data sequence, shifts the input data sequence and generates the shifted input data sequence, generates an OFDM symbol by applying an IFFT(Inverse Fast Fourier Transform) with respect to the shifted input data sequence, exchanges an I and a Q components of a part of the OFDM symbol, generates an RF signal by modulating the exchanged OFDM symbol, and transmits the RF signal, wherein the processor exchanges the I and Q components according to the following equations with respect to the OFDM symbol with $d_{frame}[k]$, k=0,1, 2, ...:

$$C_{D,2n}[l] = d_{frame}\left[\frac{N_D}{2}s(2n - N_{sync} - N_{hdr}) + l\right]$$

$$C_{D,2n+1} = Pspread[n]s\left\{imag\left(d_{frame}\left[\frac{N_D}{2}s(2n - N_{sync} - N_{hdr}) + (N_D - 1 - l)\right]\right) + jreal\left(d_{frame}\left[\frac{N_D}{2}s(2n - N_{sync} - N_{hdr}) + (N_D - 1 - l)\right]\right)\right\}$$

Where, $C_{D,2n}[1]$ denotes the first OFDM symbol, $C_{D,2n+1}[1]$ denotes the second OFDM symbol, $N_D$ denotes a constant value for grouping the OFDM symbols, $N_D$ is a number of data subcarriers, $N_{sync}$ is a number of symbols of a PLCP preamble, and $N_{hdr}$ is a number of symbols of a PLCP header.

3. The OFDM transmitting apparatus of claim 2, wherein the Pspread is calculated by the following equation:

$$Pspread[n] = p\left[\mod\left(n - \frac{N_{sync}}{2} + 6, N_{FFT} - 1\right)\right]$$

where $N_{FFT}$ is a number of points in a Fast Fourier Transform (FFT) and p[.] denotes a pseudo random sequence of a predetermined length.

* * * * *

UNITED STATES PATENT AND TRADEMARK OFFICE
CERTIFICATE OF CORRECTION

PATENT NO. : 7,577,160 B2
APPLICATION NO. : 11/663607
DATED : August 18, 2009
INVENTOR(S) : Larsson et al.

It is certified that error appears in the above-identified patent and that said Letters Patent is hereby corrected as shown below:

Claim 2

Column 10, line 58 delete "$C_{D,2n+1}$" and insert -- $C_{D,2n+1}[l]$ --

Claim 2

Column 10, line 63 delete "Where, $C_{D,2n}[l]$ denotes the first OFDM symbol, $C_{D,2n}[l]$" and insert -- Where, $C_{D,2n}[l]$ denotes the first OFDM symbol, $C_{D,2n}[l]$ --

Signed and Sealed this

Sixth Day of October, 2009

David J. Kappos
*Director of the United States Patent and Trademark Office*